(12) United States Patent
Troy

(10) Patent No.: US 12,548,642 B2
(45) Date of Patent: Feb. 10, 2026

(54) SYSTEMS AND METHODS FOR HEALTH IMPROVEMENT AND SYMPTOM REDUCTION

(71) Applicant: Terrence Troy, St. Paul, MN (US)

(72) Inventor: Terrence Troy, St. Paul, MN (US)

(*) Notice: Subject to any disclaimer, the term of this patent is extended or adjusted under 35 U.S.C. 154(b) by 0 days.

(21) Appl. No.: 18/634,714

(22) Filed: Apr. 12, 2024

(65) Prior Publication Data
US 2024/0347145 A1 Oct. 17, 2024

Related U.S. Application Data

(60) Provisional application No. 63/495,728, filed on Apr. 12, 2023.

(51) Int. Cl.
*G16H 10/20* (2018.01)
*G16H 20/10* (2018.01)
*G16H 80/00* (2018.01)

(52) U.S. Cl.
CPC ............ *G16H 10/20* (2018.01); *G16H 20/10* (2018.01); *G16H 80/00* (2018.01)

(58) Field of Classification Search
CPC ........ G16H 10/20; G16H 20/10; G16H 80/00; G16H 20/70; G16H 50/20; G16H 70/40
USPC ....................................................... 705/2–3
See application file for complete search history.

(56) References Cited

U.S. PATENT DOCUMENTS

2017/0004260 A1* 1/2017 Moturu .................. G16H 10/60
2021/0398672 A1* 12/2021 Apkarian ............... G16H 50/20
2022/0183991 A1* 6/2022 Daya ......................... A61J 3/06

OTHER PUBLICATIONS

Bernstein et al., Treating Pain With Open-Label Placebos: A Qualitative Study With Post-Surgical Pain Patients, The Journal of Pain, vol. 22, Issue 11, Nov. 2021, pp. 1518-1529 (Year: 2021).*
Blease et al., Open-label placebo clinical trials: Is it the rationale, the interaction or the pill?, BMJ Journals, Evidence-Based Medicine 2020; vol. 25: pp. 159-165 (Year: 2020).*

* cited by examiner

*Primary Examiner* — Joy Chng
(74) *Attorney, Agent, or Firm* — Merchant & Gould P.C.

(57) ABSTRACT

An approach to supplementing or replacing at least one of a prescribed pharmaceutical can include receiving a usage agreement, executed by at least one of the subject or a medical professional, to use an inert substance according to a treatment regimen. A name or description of at least one health improvement product or protocol can be received, as well as an indication of a downtitration of the pharmaceutical. A treatment regimen can be determined, including an administration of the inert substance to the subject following the downtitration, including notifying the subject that the inert substance is not pharmacologically active.

15 Claims, 13 Drawing Sheets

SYSTEMS AND METHODS FOR HEALTH IMPROVEMENT AND SYMPTOM REDUCTION

CLAIM OF PRIORITY

This application claims priority to U.S. provisional Application Ser. No. 63/495,728, filed on Apr. 12, 2023, which is incorporated by reference herein in its entirety, and the benefit of priority of is claimed herein.

BACKGROUND

Clinical trials are used to verify and validate a drug's effectiveness. One part of a clinical trial is to compare the results of testing a drug in production against a placebo. A placebo is simply an inactive mixture, compound, suspension, or solution that looks like the drug under test. By comparing results from a group being dosed with active ingredients and a group being provided a placebo, a researcher is able to better determine the actual effectiveness of a drug.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

The placebo effect is a phenomenon which can involve negative symptoms perceived by an individual, being altered, alleviated or eliminated by an inert substance. Without being bound by theory, the underlying psychological mechanism causing the effect to occur can be described as either anxiety reducing placebo or expectation creating placebo. Anxiety reducing placebo occurs when the belief that a pharmaceutical product actually works reduces anxiety levels (as a result of which the symptoms may become less intense or even disappear). Expectation creating placebo occurs when the mere belief that a drug will be effective actually triggers real physiological changes in brain areas of reward, motivation, and emotion (generating the expectation necessary to modify pain or other symptoms). For example, placebo effects can be described via psychological concepts such as classical conditioning and expectation pathways.

For certain users, a placebo effect can involve various physiological and neurological responses, which can in turn cause a realized health change. For example, in a clinical trial setting involving a placebo group to determine a "baseline" population against which an active drug population can be compared (e.g., to determine efficacy), the placebo group may experience an unexpected therapeutic benefit despite foreknowledge that they are receiving a placebo and not the active drug. Such an unexpected placebo effect can be attributable, at least in part, by a resemblance of a placebo regimen with an active drug regimen or a placebo-taker subjecting themselves to an apparent medical authority of a professional. Placebos carry several advantages as related to certain drugs, such as lacking negative side-effects, being less expensive, lacking risk, and allowing for greater self-administration due to a lack of a risk of addiction or overdose. The present inventor has recognized a need for a technique to leverage a placebo product for physiological or neurological response and without requiring that the user or subject be involved in a clinical trial. For example, a technique for improving subject health can involve tailoring characteristics of a placebo or its administration regimen based on subject user-input corresponding with an active drug the subject may be taking for symptom relief. The tailoring can include selecting physical characteristics such that the placebo regimen represents, mimics, or resembles a protocol involving an active drug. The technique can include receiving subject feedback as to whether the subject is experiencing symptom relief attributable to the placebo effect, and performing according downstream treatment steps based on the subject feedback. Such a technique can facilitate, for certain responsive subjects, a complete replacement of an active drug with a placebo product or a partial replacing of an active drug following a downtitration of the active drug.

Figure 1A:
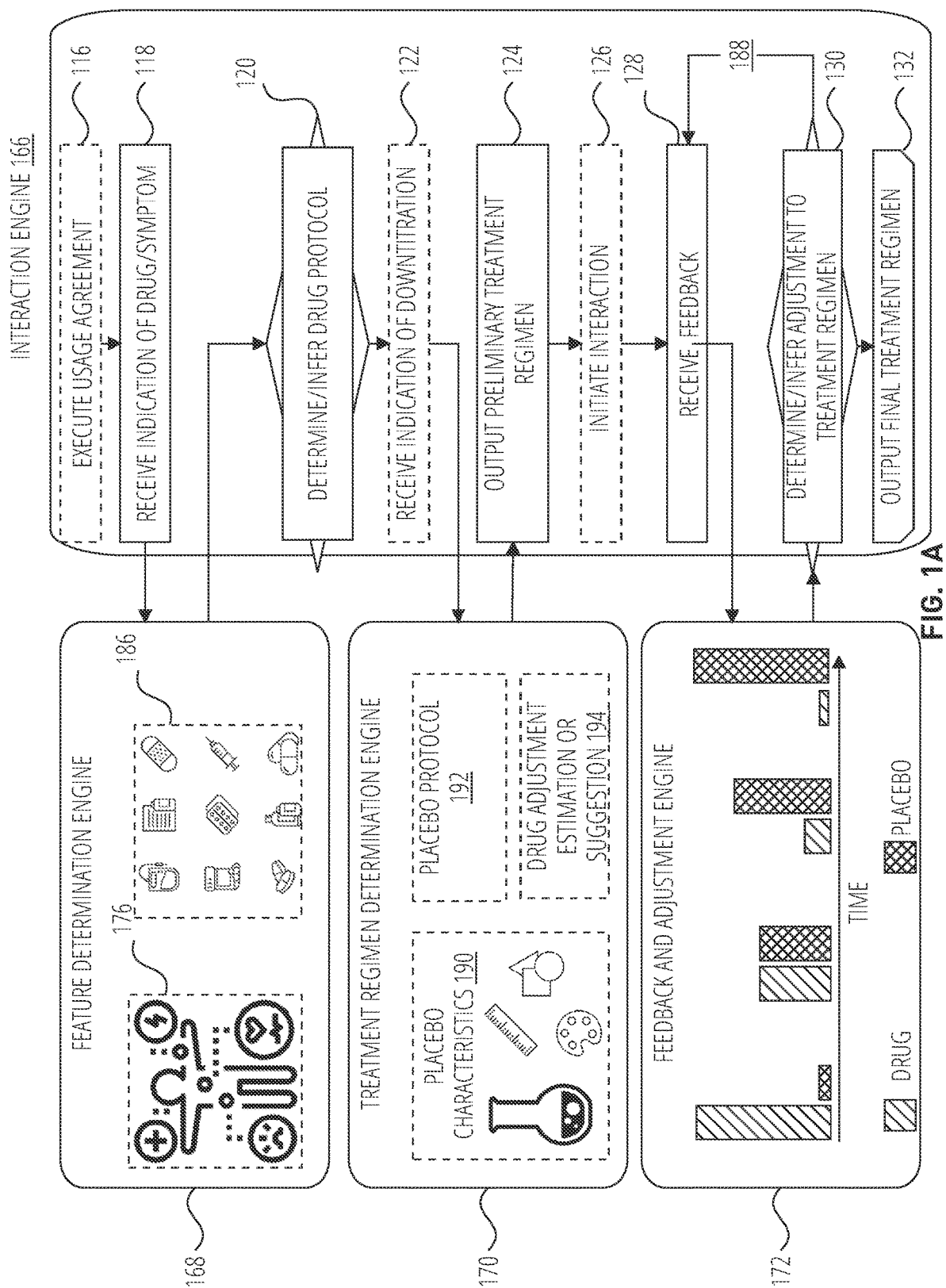
FIG. 1A illustrates an example of a technique for health improvement and symptom reduction.

FIG. 1A illustrates an example of a technique 100 for health improvement and symptom reduction. Such a technique 100 can help in methodically transitioning subjects from certain conventional treatments, including at least one prescribed pharmaceuticals, over-the-counter (OTC) drugs, or homeopathic therapies, to a regimen involving an inert substance. Herein, the term "drug" can be used to describe health improvement products or protocols such as prescribed pharmaceuticals, OTC drugs, and homeopathic therapies alike. Thus, the term "drug" need not be limited to therapies regulated by any administration (e.g., the food and drug administration (FDA)) or necessarily considered an active drug by the medical community. Rather "drug" herein refers indiscriminately to health improvement products or protocols which the subject or the health professional advising the subject wishes to reduce or remove from a subject treatment protocol. Also herein, the terms "placebo" and "inert substance" can be used interchangeably and each generally refer to a substance lacking an active medicinal ingredient, drug, or homeopathic agent known to treat a desired target symptom. The technique 100 can be performed, at least in part, via a health improvement system, which can be integrated in an online ecommerce platform, a digital marketplace, a mobile application, or in-person service, or a combination thereof. In an example, sever of the blocks described below (e.g., block 116, block 118, block 120, block 122, block 124, block 126, block 128, block 130, and block 132) can be performed via a subject interaction engine 166 of the health improvement system.

At block 116, the process can be commenced by securing a usage agreement from either the subject or a medical professional, which sanctions the use of an inert substance according to a predetermined treatment regimen. In a case where a subject provides the agreement, the subject can further authorize their medical professional to legally monitor and provide guidance, support, and/or intervention at any point in time during use of the technique. Such an agreement can be contractually equivalent to informed consent. Additionally or alternative, a placebo taker can be required to sign a liability waiver, acknowledging that he or she is acting voluntarily in wanting to use a placebo to demonstrate its powers, and acknowledging the risk that no effect may occur or no effect may have a significant effect on a symptom or disease experienced by the subject. In an example, the executed usage agreement can involve that the subject is be required or encouraged to maintain a health or symptom diary. The diary can be pre-configured with an entry template, and can include one or more user interfaces for accessing, providing, and/or reviewing entries in the diary. In a case where a medical professional (e.g., General Practitioner doctor or specialist) provides the agreement, subjects can be required to visit the medical professional during a down-titration (with respect to the drug) phase of the technique. The medical professional can use the down-titration phase visits to monitor the subject's transitions and provide advice, support, counseling, and bereavement counseling in order to tailor an original treatment regimen. Beside the diary, subjects can be provided an application or a website to access certain diary pages on which past entries by the subjects are viewable (and even editable and verifiable) to the subject, any medical professional, family members, and/or a predetermined community group. In an example, the diary provides reminder module for reminding the subject of a diary entry. The reminder can be a text message or an email notification to the subject. This can alert the subject when the diary entry is due to be completed by the subject. The diary reminder service is expected to elicit a good will approach facilitates diligent compliance, increases subject interaction, participation and engagement, improves the accuracy of the process, improves subject safety and helps reduce user liability.

At block 118, the process can include receiving an indication of a drug 186 or a symptom 176 of the subject. For example, the received indication can include a name or description of the drug 186 that the subject is currently taking (e.g., 10 mg. Xanax), a symptom 176 that the subject is experiencing (e.g., anxiety), or both. Such an indication can be received via a Feature determination engine 168 health improvement system. In an example, the Feature determination engine 168 can receive the indication including a name or description of the drug 186 or the symptom 176 via an online questionnaire, e.g., provided to the subject via an e-commerce platform. Alternatively or additionally, the indication can be received in the form of a drug list or symptom list verified by a medical professional advising the subject. In an example, a received name or description of the drug 186 can be used to determine certain physical or other characteristics of the drug 176, such as a size, color, shape, or administration method of the drug 186 which the subject seeks to reduce or replace. The feature determination engines 158 can also draw inferences about physical characteristics of a drug which the subject is possibly take, e.g., based solely on the received symptom 176. For example, the feature determination engine 158 can deduce a list a possible drugs based on the symptom 176. In an example, physical characteristics of the deduced list of possible drugs can be compared with one another to determine common characteristics for drugs associated with the received symptom 176, such that a physical characteristic of the drug 186 can be inferred or determined without receiving the name or description of the drug 186 directly. In another example, the feature determination engine can facilitate the receiving of detailed information about the drug, such as form (pills, injectables, liquids, transdermals, or chewables), size, shape, color, taste, texture, packaging and administration instructions.

At block 120, the technique can involve determining or inferring a present or past drug protocol based on the received indication of the drug 186 or the symptom 176 of the subject. For example, the protocol can include a dosage, a timing parameter, a combination of different drugs, or a combination thereof. The protocol can also include health improvement objectives of the subject as indicated by the subject or a medical professional advising the subject. In an example, the health improvement objectives can include a targeted symptom, a disease, performance goals, or other health measuring indicators, as defined, indicated by, or received by the subject.

At block 122, the technique can involve receiving an indication of a downtitration of the drug. The received downtitration can be an amplitude change, a time-related change, a recommended change, a completely discontinuing of the drug, or a combination thereof, e.g., according to a subject treatment plan described by a medical professional representing a downtitration regimen. In an example, the downtitration can be based on the duration of the drug use, frequency of the drug use, amount taken, the physical characteristics, a type of the drug used, a drug application method of the drug, performance goals, objectives, or other health measuring indicators, as defined, indicated by, or received by the subject or a medical professional advising the subject.

In an example, the health improvement system includes a treatment regimen determination engine 170 for determining a preliminary treatment regimen, including an inert substance. For example, suggestion, sale, or administration of the inert substance can include explicit communication to the subject about the inert substance's non-pharmacological nature. The treatment regimen determination engine 170 can involve calculating various parameters of the preliminary treatment regimen (e.g., type of inert substance, dose, dosage, timing parameter, etc.). For example, the treatment regimen determination engine 170 can determine one or more Placebo Characteristics 190, a placebo administration protocol 192, and optionally, a Drug Adjustment Estimation or Suggestion 194. For example, the Placebo Characteristics 190 can include shape, color, size, texture, odor, packaging, brand, composition, or ingredients of the placebo. The placebo administration protocol 192 can include administration dosage and delivery methods and one or more timing parameters, e.g., as derived from the calculated schedule of the down-titration. The administration dosage can be adjustable by a user, e.g., within a range of values or dose amounts. The placebo administration protocol 192 can be determined according to various methods, such as authorization of the medical professional or according to user preferences, as implemented and interfaced via a health improvement system, e.g., within the placebo administration module. In an example, the treatment regimen determination engine 170 can output the preliminary treatment regimen (e.g., to the subject or a healthcare professional advising the subject), such as at block 124.

Optionally, at block 126, the subject interaction engine 166 can initiate an interaction with the subject. For example, the interaction can involve private dialogues through electronic communication platforms, the use of AI chatbots, or the support of a human user group. The subject can be further provided information about some inert substance, available on the health improvement system, produced by the health improvement system directly, recommended or authorized by medical professionals, whose support or identity can be conditional, withdrawn or anonymous. A chatbot can initiate, respond to, or mediate messages between the subject and others (e.g., the health improvement system, a human user, and the like), via one or more communication channels, such as online chat, email, social media, and others. In an example, messages produced according to the interaction between the user and the chatbot can be analyzed, e.g., to determine an emotional state of the user, such as stress, panic, fear, joy or calm. In an example, the human user group can comprise a homeopath, a medical professional, a health researcher, a journalist, or a subject peer. In an example, the human user group can be prompted with probes or questions attempting to solicit diagnostic information or to extract key features of a regimen likely to succeed or receive feedback or suggestions which can enhance the success outcome, user experience or adherence to the regimen, monitor user's progress, provide clinical support, identify adverse events, detect user's psychological or emotional state or arbitrations. The probes or questions have a goal or purpose of understanding which inert substance is most suitable for a particular down-titration phase, which physical or psychological treatments are considered feasible for the user, which are safe and effective and not contraindicated and predicting, based at least in part on a relationship between the inert substance, dosage, psychosocial/interactive and environmental stimuli, treatment outcomes or overall end-user satisfaction. Additionally, the human user group can use context or emotion driven questions and probe (e.g., using machine learning classifiers) to give users valuable feedback about the transition treatment regimen.

At block 128, feedback is received from the subject regarding the frequency of symptom occurrence after starting the treatment regimen, which may prompt adjustments to the regimen or changes to the original health improvement product or protocol based on the subject's satisfaction or the severity of symptoms. The feedback can be input into a feedback and adjustment engine 172. In an example, the feedback and adjustment engine 172 can facilitate adjustment of the treatment regimen including the inert substance, the drug adjustment estimation or suggestion 184, or both based on the feedback received from the subject regarding the frequency of symptom occurrence or other subject feedback (e.g., feedback from the initiated interaction with the subject at block 126. At block 130, the technique can involve determining or inferring an adjustment to the treatment regimen based on an output from the feedback and adjustment engine 172. For example, the feedback and adjustment engine 172 can determine that a drug was downtitrated or replaced with the inert substance too quickly and ought to be uptitrated to avoid symptom reemergence of the subject. In another example, the feedback and adjustment engine 172 can determine that the drug can be further downtitrated and replaced with a greater amount or frequency of the inert substance. Blocks 128 and 130 can be repeated, such as including interaction with the feedback and adjustment engine 172, via feedback loop 188 until the treatment regimen substantially reaches a steady state or until intervention via the subject or the healthcare professional advising the subject. At block 132, once the technique has reached a substantially steady state or upon the intervention, a final treatment regimen can be output to the subject or the medical professional advising the subject.

Figure 1B:
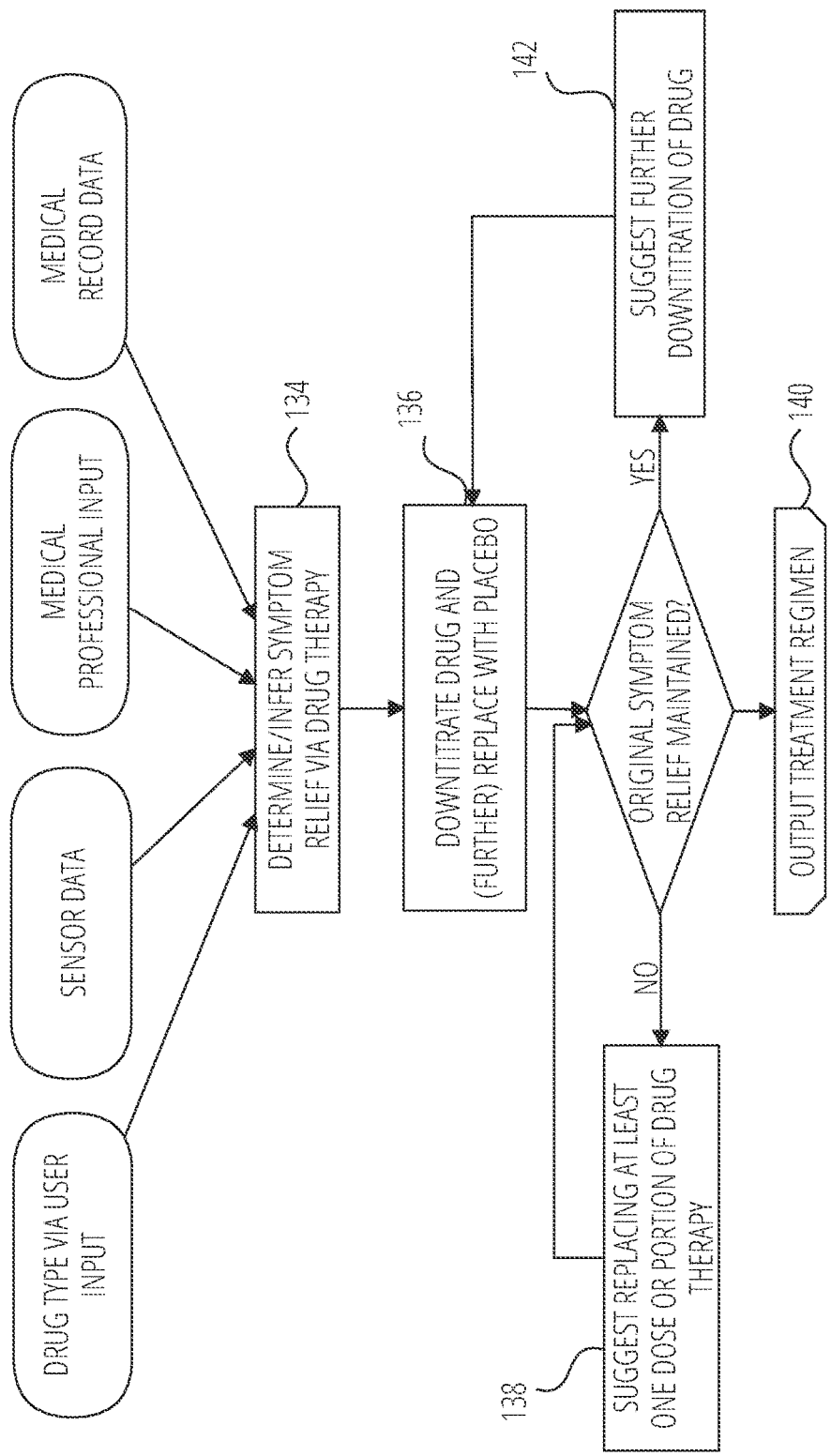
FIG. 1B is a flowchart showing a feedback and adjustment of a treatment regimen.

FIG. 1B is a flowchart showing a feedback and adjustment of a treatment regimen. In an example, the feedback and adjustment engine 172 can receive inputs (e.g., a drug type via a user input, sensor data, medical professional input, subject medical record data, or a combination thereof). At block 134, the feedback and adjustment engine 172 can determine or infer symptom relief via the drug therapy based on at least one indication of a drug being taken and the received input(s). In an example, at block 136, the health improvement system can facilitate (e.g., recommend, suggest, or prescribe) a downtitration of a drug and to at least partially replace the drug with a placebo. The health improvement system can determine (e.g., based on at least one of sensor data, a user input such as a questionnaire, etc.) whether the original symptom relief, as provided by the original titration of the drug, has been substantially maintained despite the downtitration.

In an example, an indication that the original symptom has been substantially maintained despite replacing at least a portion of the drug with the inert substance can indicate that the subject has experienced a placebo effect. For example, if it is determined that the original symptom relief has been substantially maintained, at block 142 the feedback and adjustment engine 172 can suggest further downtitration of the drug. Alternatively, at block 138, if it is determined that the original symptom relief has not been adequately maintained, the feedback and adjustment engine 172 can suggest replacing at least one dose or portion of drug therapy back toward the original titration.

Figure 2:
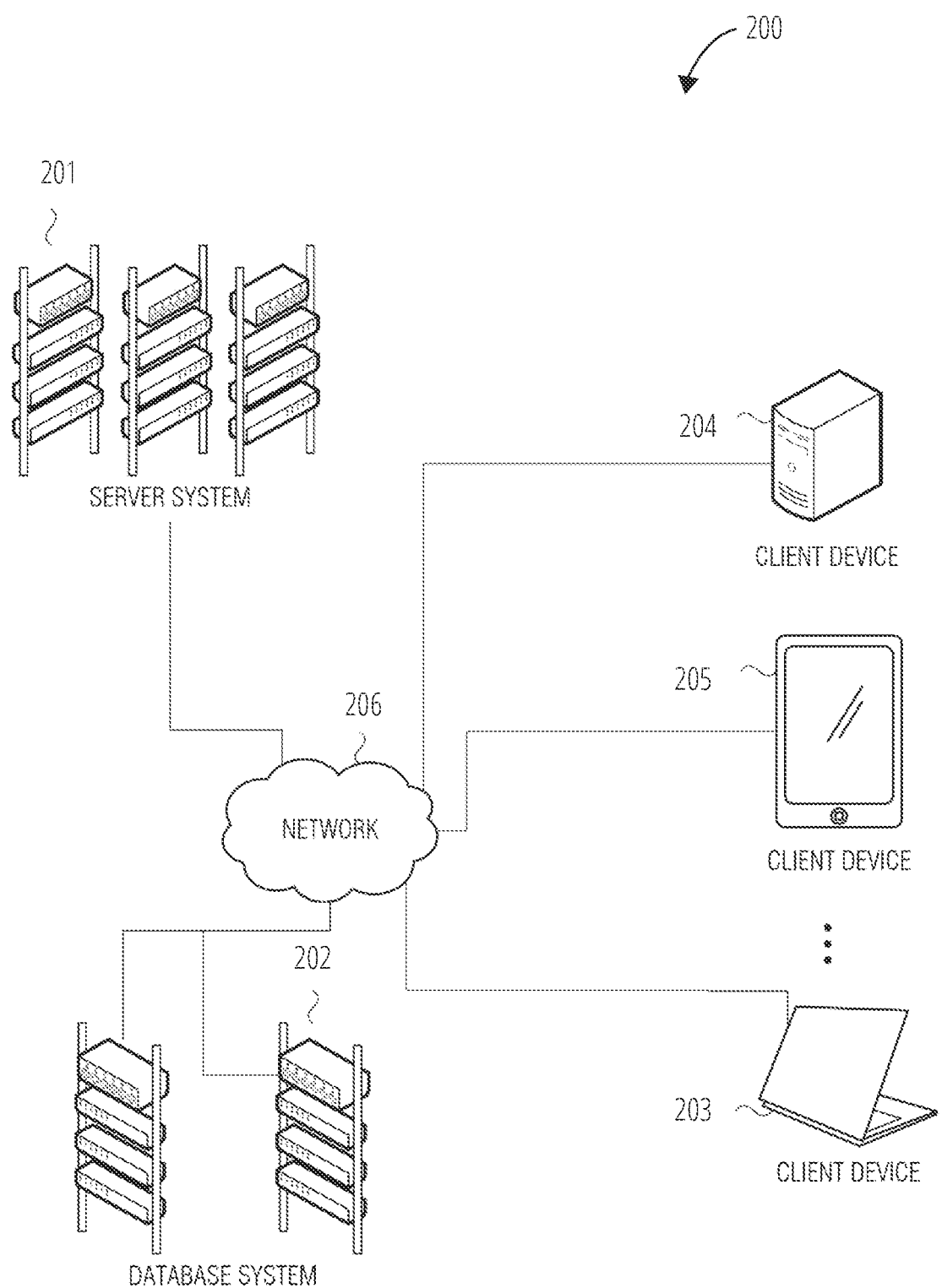
FIG. 2 is a schematic diagram illustrating an operating environment.

FIG. 2 is a schematic diagram illustrating a system 200, according to an embodiment. The system 200 includes a server system 201, a database system 202, and multiple client devices 204, 204B, . . . , 204N (collectively referred to as client devices 204), connected to one another using one or more networks 206.

The server system 201 may include one or more virtual or physical servers to provide applications, services, or other functionality to the client devices 203. The applications, services, and other functions may be used to register a placebo, certifying effectiveness of placebos, advertising and marketing placebos, match potential users with available placebo products, and other operations to support placebo distribution or development. The server system 201 may be implemented in a datacenter, a server farm, a core network, fog network, edge network, cloud network, or other topology or organization, or a combination of server implementations. The server system 201 may be implemented to provide on-demand services, such as in a software-as-a-service (SaaS) model. Using a SaaS model, applications may be delivered over the Internet as a service to one or more client devices 203. As such, instead of installing and maintaining software at each client device 206, the server system 201 manages the application, security, upgrades, and other aspects of the service.

The database system 202 is used to store information about placebos, subjects, customers, providers, health insurance data, governmental or regulatory data, and the like. The database system 202 may include one or more relational database servers to provide data storage and retrieval services to the server system 201 or client devices 203. The database system 202 may be implemented as a distributed storage solution, either as a homogeneous or heterogeneous database, across multiple database servers. The database system 202 may implement various data warehousing mechanisms, such online analytical processing (OLAP). OLAP provide analytics about database transactions. OLAP may also be used to provide data modeling for easier analysis and understanding. As such, the database system 202 may be a data warehouse in some implementations.

The networks 206 may include any of a variety of wired or wireless networks, or combinations of such networks. These networks may include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A networks).

Through use of the server system 201, the placebo effect for a user may be enhanced. There are at least three aspects that can enhance placebo effect: 1) the formulation (e.g., composition, form, mode of administration), 2) the usage agreement, and 3) ongoing customer support.

The dosage form of a placebo may enhance the placebo effect for a user because by resembling an active pharmaceutical, it reinforces the psychological belief that a placebo product will produce a positive effect on a user. The placebo product may be produced in various dosage forms such as solids (e.g., capsules, tablets, etc.) or liquids (e.g., cream, gel, nasal drop, inhaler, injectable, etc.). The placebo product may also be provided with certain characteristics such as a taste, smells, texture, viscosity, etc. Users may receive greater placebo effect depending on the how the placebo is produced (e.g., formulation), the dosage form and characteristics of the placebo product. The server system 201 provides a platform for manufacturers or sellers to create different varieties of placebo products. The end user (e.g., subject or placebo user) may also design a placebo product according to their own specification.

The placebo product may be created to treat a certain condition such as medical back conditions, foot conditions, head conditions, stomach or digestive system conditions, etc. For any given condition, one or more placebo forms may be provided. In an embodiment, multiple placebo forms are available for any given condition. The placebo product may take on a dosage form that resembles an over-the-counter (OTC) or prescription pharmaceutical, such as TYLENOL®.

Further enhancing the placebo effect is the use of a formal agreement or usage agreement between a placebo provider and the placebo consumer (e.g., subject). The usage agreement is a customer engagement between the placebo user and the placebo manufacture or seller. The usage agreement may include various elements including, but not limited to a treatment regimen, provisions for recording or periodically reporting subject compliance, a feedback or review requirement during or after the treatment, confidentiality clauses or non-disclosure agreements, or the like. A drug regiment is treatment plan that specifies the dosage, the schedule, and the duration of treatment. For example, a usage agreement may include a term that the customer may only purchase a placebo product if the customer agrees to commit to various terms of the usage agreement. As another example, the usage agreement may provide the time of placebo product administration, the dosage of the placebo product at each administration, the method of administration, the method of recording or reporting the placebo product administration, or the like. By engaging in a formal agreement to take the placebo product the user is provided with a psychological reinforcement of the placebo effect. In some embodiments, a usage agreement is used for each placebo dosage form that the user obtains and uses, even where multiple different dosage forms are used to treat the same condition.

Ongoing support and involvement with the placebo treatment also helps reinforce the placebo effect. As such, the ongoing customer support is the third aspect that can enhance the placebo effect. Customer support of post-purchase customer engagement may be used to trigger or reinforce the placebo effect. Customer support may provide affirmations that help trigger or reinforce the placebo effect. Post-purchase customer engagement may be between the placebo user and a placebo seller, a placebo health counselor, a manufacturer, or other placebo users. The placebo user may access, receive, or provide user feedback, social media posts, user support groups, effectiveness reports, "expert" influencer feedback, or the like. Customer engagement through customer support or post-purchase customer engagement amplifies the placebo effect. Customer support may include coaching, either in a one-on-one setting or in a group setting. Customer support may include support groups.

In other implementations, coaching may be provided in part or in full using artificial intelligence (AI) chatbots. Input data, which may be in the form of text, speech, or the like, is ingested and analyzed by a neural network, which is designed to ingest input data from a client and provide coaching or a health recommendation. The health recommendations may be oriented to use of placebos and avoiding or reducing use of conventional drugs.

A system and method for providing personal coaching services with AI advice is disclosed. The system includes a computer processor configured to receive and analyze data input from a user regarding their goals, challenges, and progress. The processor uses this data to generate personalized coaching advice and recommendations. The system also includes an AI module that analyzes the user's data and generates additional advice and recommendations based on the user's individual needs and preferences. The system provides a comprehensive coaching service that combines the benefits of personalized coaching with the power of AI technology.

Personal coaching services have become increasingly popular in recent years as individuals seek to improve their personal and professional lives. However, many coaching services are limited in their ability to provide customized advice and recommendations. AI technology has the potential to enhance personal coaching services by providing personalized advice and recommendations based on individual user data.

The disclosed system and method for providing personal coaching services with AI advice provides a comprehensive coaching service that combines the benefits of personalized coaching with the power of AI technology. The system includes a computer processor that receives and analyzes user data, generates personalized coaching advice, and provides additional AI-generated advice and recommendations based on individual user needs and preferences.

Coaching services may be implemented using an online system, such as a server system to provide an interactive session with a client device. A computer-implemented method may include operations for providing life coaching services that receive input data from a client device, process the input data using an artificial intelligence algorithm to generate personalized coaching recommendations, and provide the coaching recommendations to the client device via a user interface of the client device.

In another example, a system may be configured to provide life coaching services. The system may include a database for storing client data of a client that operates a client device, an artificial intelligence module for processing the client data to generate personalized coaching recommendations, and a user interface for presenting the coaching recommendations to client via the client device.

In another example, a method for training an artificial intelligence algorithm to provide life coaching services may include the operations of: receiving input data from a set of clients, processing the input data to generate coaching recommendations, receiving feedback from the set of clients on the effectiveness of the coaching recommendations, and using the feedback to refine the artificial intelligence algorithm.

In another example, a computer-readable storage medium may contain instructions for providing life coaching services, the instructions, which when executed by a computer, cause the computer to perform operations comprising: receiving input data from a client device, processing the input data using an artificial intelligence algorithm to generate personalized coaching recommendations, and providing the coaching recommendations to the client device via a user interface.

In another example, an AI-powered life coaching system includes a natural language processing (NLP) module for interpreting client input from a client, a machine learning module for generating coaching recommendations based on the client input and prior coaching sessions with the client, and a recommendation engine for providing the coaching recommendations to the client via an electronic device.

The system may implement artificial intelligence (AI) for coaching individuals to achieve healthier lifestyles. The underlying implementation is based on incorporating advanced predictive analytics, machine learning, and data processing capabilities of AI to create personalized coaching programs. By analyzing user data, including demographics, medical history, health goals, and exercise patterns, the AI system can provide personalized coaching that caters to the unique needs, preferences, and goals of the user.

The AI coaching system may include several interrelated elements, including a data collection module, a data processing module, a machine learning module, and a feedback module. The data collection module collects user data through sensors and wearables, such as fitness trackers, heart rate monitors, and blood glucose meters. The data processing module analyzes the data, identifies patterns, and generates insights that form the basis for personalized coaching programs.

The machine learning module uses algorithms that learn from user data over time, becoming increasingly effective and personalized. The feedback module provides the user with actionable insights and feedback, which help them make healthier choices and achieve their health goals.

Overall, the system provides a novel approach to promote healthier lifestyles, utilizing the power of AI to help individuals improve their health outcomes. The system has broad applicability, including but not limited to weight management, diabetes management, and mental health coaching, among others. As such, it delivers a functional and useful solution to a real-world problem.

Figure 3:
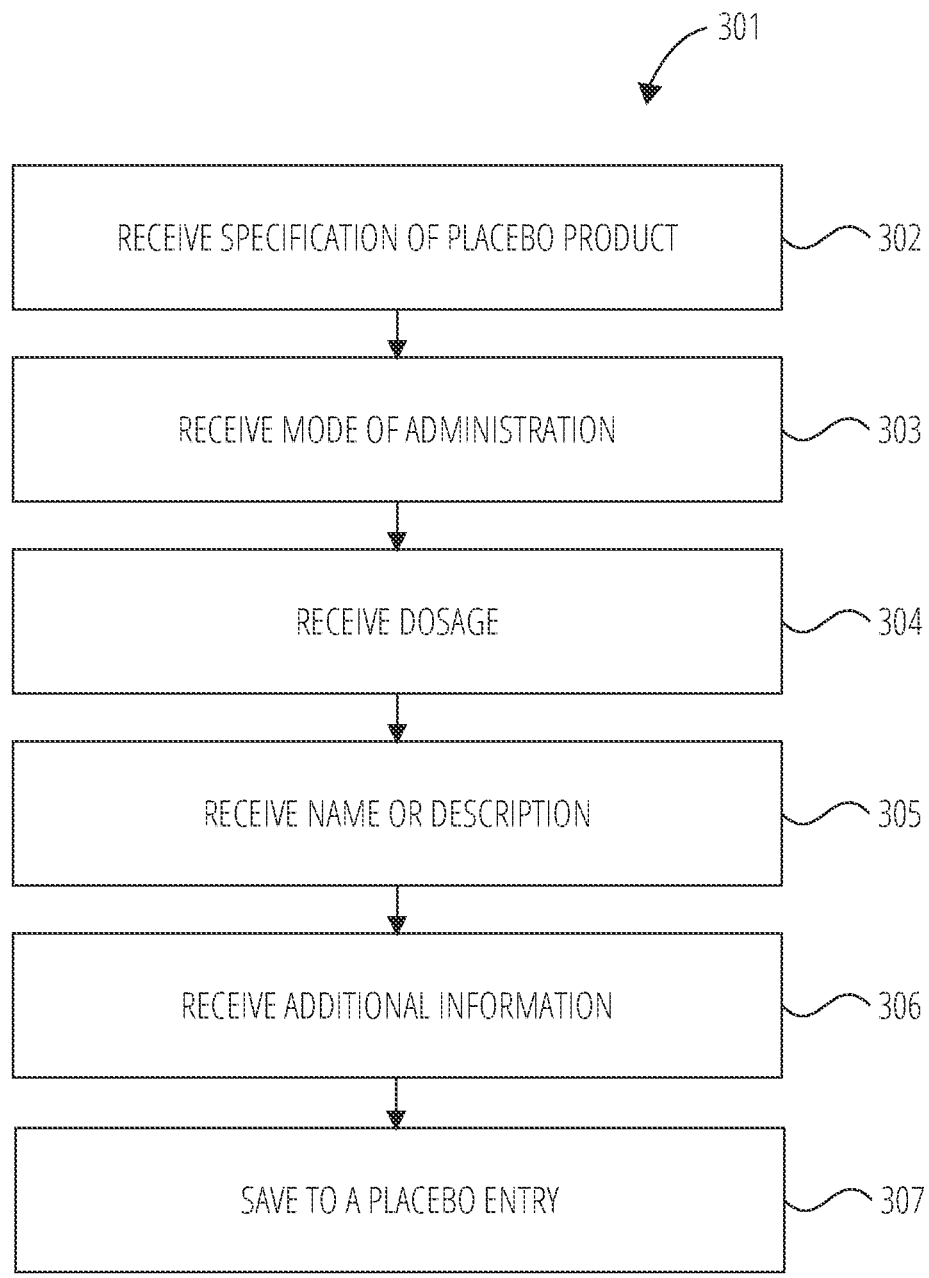
FIG. 3 is a flowchart illustrating a method for defining a placebo formulation.

FIG. 3 is a flowchart illustrating a method 301 for defining a placebo formulation, according to an embodiment. As discussed above, a placebo manufacturer, placebo consumer, or other person may use the system 200 to design, create, or initiate manufacture of a placebo product using the system 200.

At operation 302, a placebo product specification of a placebo product is received. The placebo product specification may include the physical dosage form specifications, taste specifications, smell specifications, and the like. Physical dosage form specifications may include a size, shape, texture, density, and consistency.

At operation 303, a mode of administration of the placebo product is received. The mode of administration may be one of an ingestible, an injectable, and topical treatment.

At operation 304, a dosage of the placebo product is received. The dosage amount may be dependent on the mode of administration.

At operation 305, a name or description of the placebo product is received. This may be used to track the placebo formulation (e.g., the design of the placebo product).

At operation 306, additional information of the placebo product may be received, such as graphics, text, or other markings or embellishments on the placebo product. This may be a design of a capsule to use red and blue halves with the certain text in a particular font, for example. This branding may be used to differentiate placebo products and lend and air of authenticity or resemblance to known pharmaceutical products.

At operation 307, the placebo product specifications, mode of administration, dosage, name or description, and additional information of the placebo product is saved as a placebo entry in a placebo database, the placebo entry having a unique identifier.

Figure 4:
FIG. 4 is a diagram illustrating an example user interface.

In an aspect, the user may desire to design or change a dosage form of a placebo product. The user is presented with a user interface that may include several elements, such as dropdown menus, text inputs, radio button selections, or the like to select various features of a placebo product. The features may include administration mode (e.g., pill, dissolvable, injectable, cream, ointment, oil, etc.), scent characteristics, taste characteristics, color, texture, markings, pill shape, liquid viscosity, or the like. The user interface may also include a virtual presentation of the placebo product being designed to provide the user a preview of what the manufactured placebo product will look like once it is prepared. The user may be provided an interface to save, retrieve, or share designed placebo products. The user may be a manufacturer, a seller, an end user (e.g., subject or placebo user), or another party. FIG. 4 is a diagram illustrating an example user interface 400, according to an embodiment.

In another aspect, a user may desire to test variant designs of a placebo. The variant designs may vary from a baseline, for instance, by changing a shape, size, color, texture, markings, administration method (e.g., injectable, liquid, pill, chewable, etc.), price, quantity in a package, or other aspects of a placebo product. The user may design and initiate a product testing project where one or more variant designs are provided for sale or use by users. The variant placebo products may be provided via the server system 201. Users may be selected to receive advertisements or other offers for the variant placebo products. The users who receive such offers may be a subset of all of the users of the server system 201. Users who order variant placebo products may be monitored using active or passive monitoring mechanisms to determine whether any change in effectiveness exists when compared to the baseline placebo product. User feedback, reviews, or other information may be compiled and analyzed to determine whether a variant placebo product provides an improved placebo effect over an existing version of the placebo product.

Figure 5:
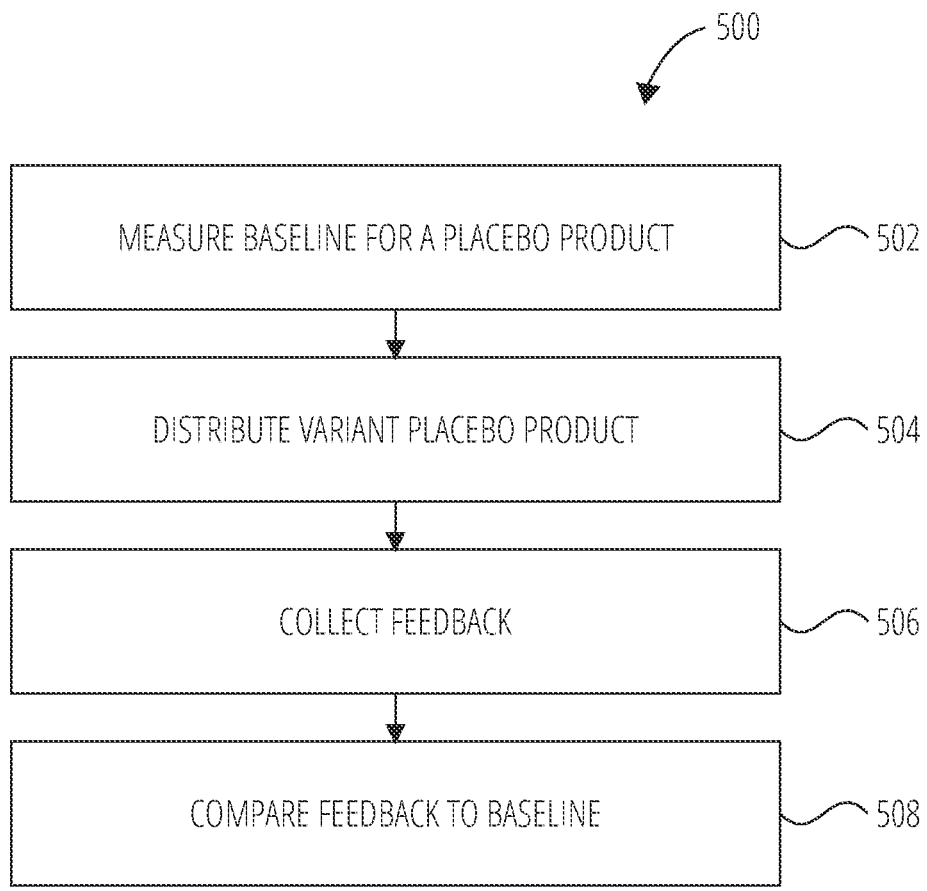
FIG. 5 is a flowchart illustrating a method for testing and developing variant placebo products, according to an embodiment.

FIG. 5 is a flowchart illustrating a method 500 for testing and developing variant placebo products, according to an embodiment. At 402, a baseline for a placebo product is measured. Measurement may be provided by way of consumer surveys, feedback received on placebo product pages, direct feedback to a physician or other attending clinician, or the like.

At 404, a variant placebo product is distributed. The variant placebo product may be distributed to a selected population (e.g., a test population) of subjects/users. The variant placebo product may be designed using method 301 or user interface 400, such as by way of system 200. The selected population of people to test the variant placebo product may register with the system 200, for instance, to ensure that the population can be tracked, is authenticate, and to provide a central repository for feedback regarding efficacy, side effects, subject compliance, and the like.

The variant placebo product may vary in one or more of color, size, shape, taste, smell, mode of administration, location of administration, or combinations, of the baseline placebo product. Further, the variant placebo product may vary in dosage or treatment regimen.

At 406, feedback is collected to measure the effectiveness of the variant placebo product. Measurement may be provided by way of consumer surveys, feedback received on placebo product pages, direct feedback to a physician or other attending clinician, or the like.

At 408, the feedback on the variant placebo product is compared to the baseline placebo product to determine whether there is an improvement in placebo effect with the variant placebo product.

The operation 502 through operation 508 may be repeated until improvement are recognized in the placebo product, mode of administration, or other features of a placebo product.

Once effective placebo products are identified, the manufacturer, creator, or seller of a placebo product may register the placebo product or sell the placebo product using the system 200.

In an aspect, a user may register a placebo product. In order to do so, the user may use an individual client device of the client devices 203 to access the server system 201. Registration of a placebo product provides authenticity of the product and may enhance the placebo effect for a user. In particular, users who purchase or obtain placebo products from an official source may believe that the placebo effect of such placebo products is stronger than placebos obtained from other sources. The server system 201 may provide one or more user interfaces for the user to register a placebo product.

Figure 6:
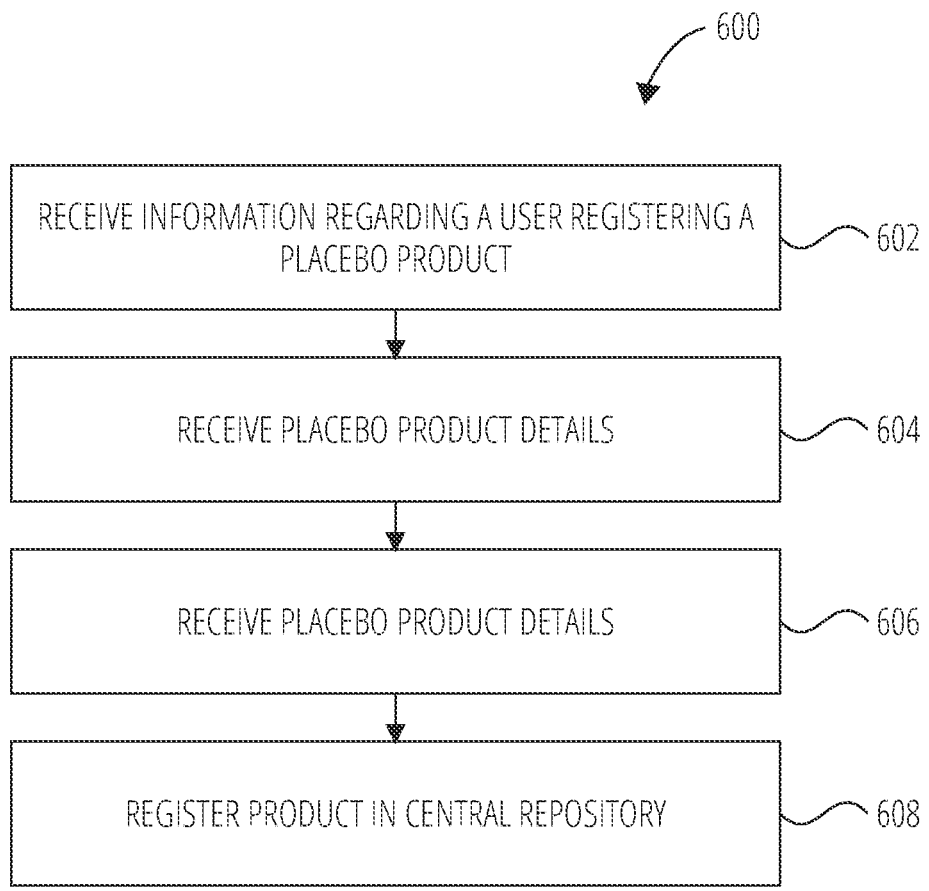
FIG. 6 is a flowchart illustrating a method to register a placebo product, according to an embodiment.

FIG. 6 is a flowchart illustrating a method 600 to register a placebo product, according to an embodiment. At operation 602, information regarding a user registering a placebo product is received. A user profile may be used where the user is a registered user of the system 200 and has an existing user profile. User information may include data, such as the user's name, mailing address, email address, business name, federal registration identification, or the like.

At operation 604, placebo product details are received. Placebo product details may include a unique placebo identification (ID), a placebo product name, a brand name of a placebo product, or the like. Placebo product details may also include formulation information, mode of administration, typical dosage or treatment, analogous drug, route(s) or administration, ingredients, package size and type, etc. Placebo product details may also include certifications, type and year of approvals, distinctive characteristics such as flavor, color, or image, etc. Placebo product details may also include corresponding drug or medication, copyright, trademark, or other notices, license information, or the like.

At operation 606, the submitted information may be verified. Verification may include operations, for example, to ensure that the copyright or trademark included in the placebo product registration is owned by the registrant.

At operation 608, the placebo product is registered in a central repository of placebo products. The placebo product may be registered for a limited time, requiring the owner or manufacturer of the placebo product to renew registration periodically (e.g., every year, every five years, etc.). The period of first registration and subsequent renewals may be of record for people evaluating whether to buy or use the placebo product. The registration date, registration renewal date, or registration expiration data may be included on placebo product packaging or on the placebo product itself.

In another aspect, a user may desire to sell placebo products through the server system 201. To do so, the user may have to perform some or all of the operations described above with respect to registering the product prior to offering the placebo product for sale.

Figure 7:
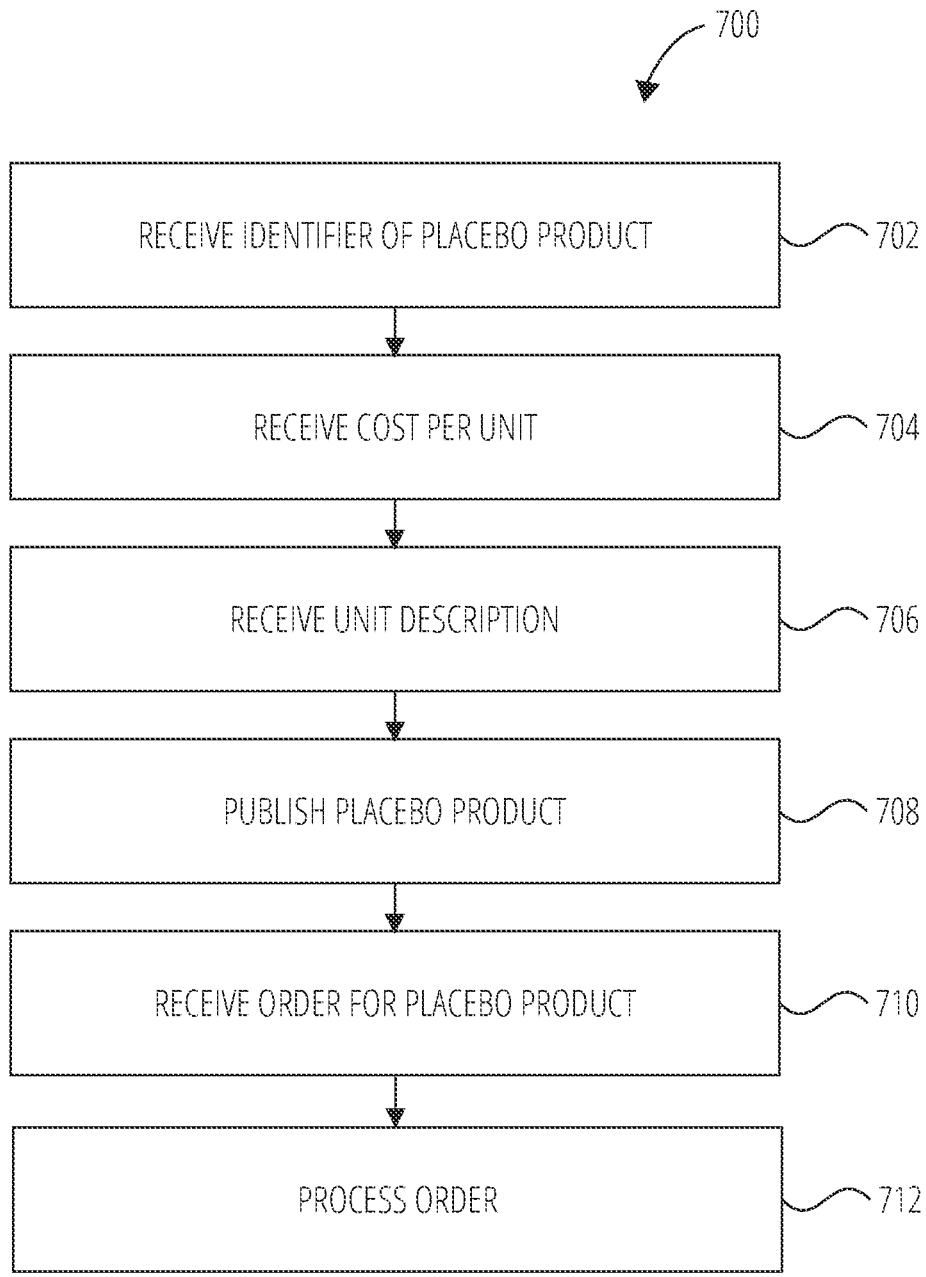
FIG. 7 is a flowchart illustrating a method for selling a placebo product, according to an embodiment.

FIG. 7 is a flowchart illustrating a method 700 for selling a placebo product, according to an embodiment. At operation 702, an identifier of a placebo product is received.

At operation 704, a cost per unit is received. The unit may be a package of N number of doses, for user interface 400 tablets. The unit may be a single package (e.g., one bottle of cream).

At operation 706, a unit description is received. The unit description includes the placebo formulation, mode of administration, and other details about the placebo product. The unit description may include a physical, mental, or emotional condition that the placebo product is meant to treat.

At operation 708, the placebo product is published on a marketplace. For instance, the placebo product may have a product page that is findable using a search mechanism and provided in a consistent marketplace user interface. In an embodiment, the placebo product is published in a manner where only a select population of users of the marketplace are able to view or purchase the placebo product.

At operation 710, an order for the placebo product is received. A checkout system may be used to store items to a shopping cart or bag for the user to purchase multiple items.

At operation 712, the order is processed. Order processing may include payment processing (e.g., credit card processing, electronic fund transfer, or the like). Order processing may include initiating packaging and shipping, tracking shipments, and the like. Order processing may also initiate other processes on the customer support side of the business. For instance, after an order, a user may be prompted to join a certain support forum, register as a user to obtain ongoing support messages via email, phone, text, or the like, or other post-sale processes.

In an aspect, a user ordering a placebo product may be presented with a usage agreement. The presentation may be online (e.g., in a popup window), through the mail with a physical copy of the usage agreement, or with another mechanism. The user may be required to execute the agreement before processing the order or receiving delivery of the placebo product (e.g., digitally sign, check a box to indicate acceptance, click a button to indicate acceptance, mail an executed copy back to the placebo provider, etc.). During treatment, the user may be required to attest to compliance of the usage agreement. This ongoing compliance reporting may be performed using daily calls to an automated hotline, clinician, administrator, or the like. The reporting may be made offline and then uploaded later (e.g., a digital diary). The reporting may be performed using a mobile device or wearable device (e.g., through client software (an "app") on a user's mobile phone or with a smartwatch). It is understood that other mechanisms may be used for the user to attest to conformance to the usage agreement.

Figure 8:
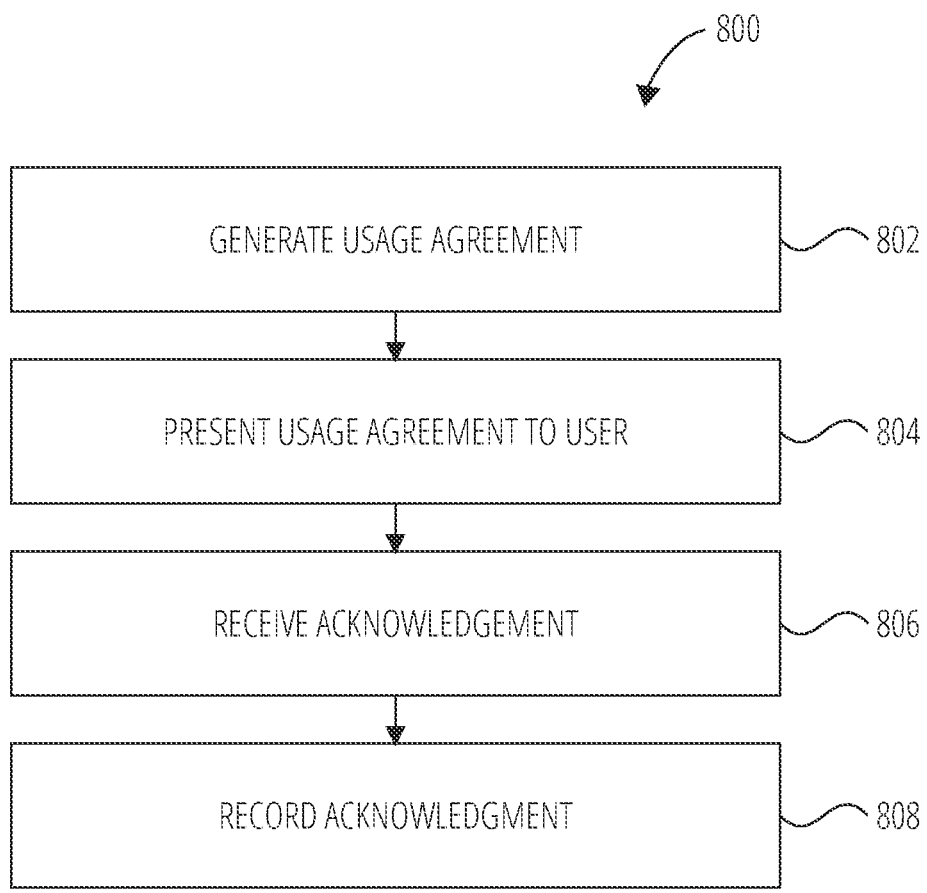
FIG. 8 is a flowchart illustrating a method for executing a user agreement, according to an embodiment.

FIG. 8 is a flowchart illustrating a method 800 for executing a user agreement, according to an embodiment. At operation 802, a usage agreement is generated for a user based on the user, a placebo product, and possibly other factors. In an embodiment, the usage agreement is focused on treatment compliance. For instance, the usage agreement may have one or more provisions that require the user to follow a specific treatment regimen. In an embodiment, the usage agreement is focused on reporting compliance. For instance, the usage agreement may require the user to follow a specific reporting protocol (e.g., daily telephone check-in, online reporting, use of a wearable or mobile device to check in, etc.).

At operation 804, the usage agreement is presented to the user. The usage agreement may be presented during a checkout process, for instance, as part of a placebo product purchase workflow. The usage agreement may be included in a flyer or other materials included in the product packaging of the placebo product. The materials may include instructions for affirming the agreement to follow the usage agreement. This instructions may instruct the user to access an online system (e.g., system 200) to record their agreement.

At operation 806, an acknowledgement to the usage agreement from the user is received. This acknowledgement shows that the user will follow the terms of the usage agreement. While there may be no provisions for failing to comply with the provisions of the usage agreement, the mere fact that the user had to agree to the usage agreement may reinforce the reality of the placebo acting as a pharmaceutical product and enhance the placebo effect. In other instances, there may be provisions in the usage agreement for breach of the usage agreement failing to comply, such as a monetary penalty, a bar on further purchases, or other restrictions based on the breach. By having actual damages or penalties in the usage agreement, the user is further incentivized to follow the treatment and also has an actual result to failing to comply, which may further enhance the placebo effect.

At operation 808, the acknowledgement is recorded. For instance, the acknowledgement is recorded in the system 200. This recordation may initiate other processes, for example, to initiate a collection process to collect subject compliance data (e.g., to track daily calls, record online check-ins, etc.).

Along with other aspects described in this document, post-sale support is another feature that can enhance the placebo effect. Thus, in another aspect the user may interact with a customer support person or other people post sale. The user may leave feedback for the placebo product, which may be made to other users of the placebo distribution system. The user may interact with other placebo users in an online forum, using a mail distribution list, or through other electronic mechanisms. Alternatively, the user may interface with one or more people in person, such as in a weekly group session. The customer support or post-purchase interactions may be dictated by a usage agreement.

Figure 9:
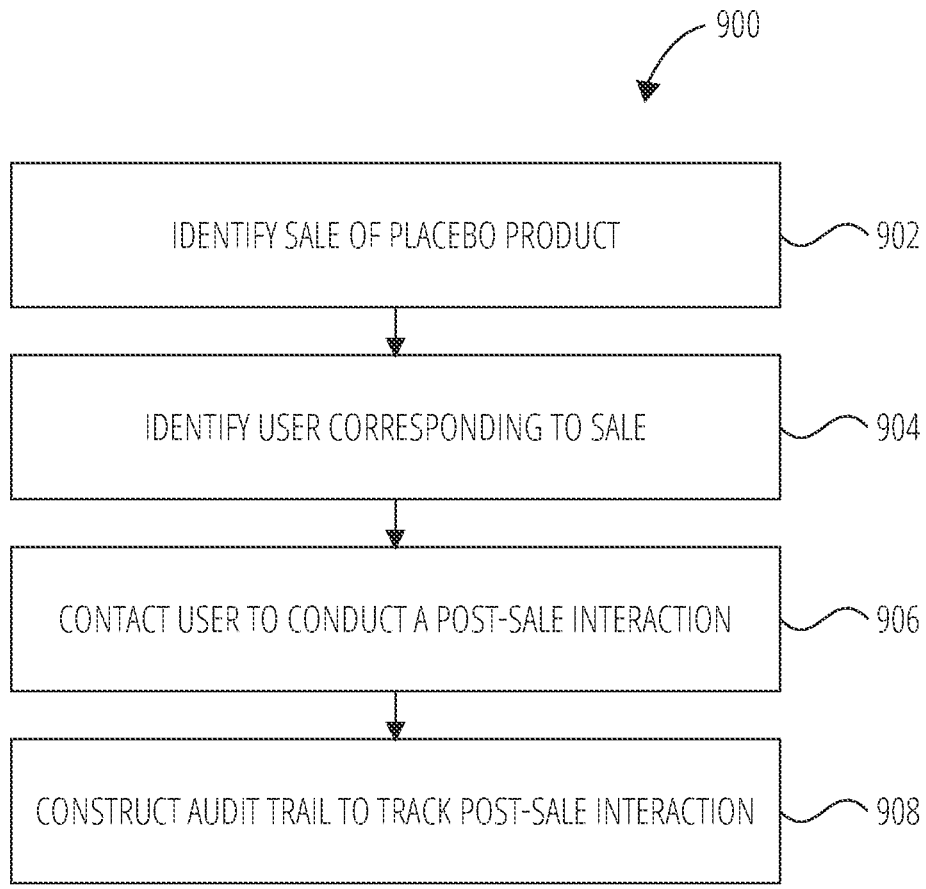
FIG. 9 is a flowchart illustrating a method for providing ongoing customer support for a user of a placebo product, according to an embodiment.

FIG. 9 is a flowchart illustrating a method 900 for providing ongoing customer support for a user of a placebo product, according to an embodiment. At operation 902, a placebo product sale is identified. Sales may be reported to a sales database. The sales database may be routinely queried to identify new sales as they occur.

At operation 904, a user of a placebo product corresponding to the placebo product sale is identified. By examining a sales invoice, the user may be identified. In other instances, the placebo product may have been purchased by one person for use by another (e.g., a parent may purchase a placebo product for use by their child). The actual placebo consumer is identified based on various database records or other information.

At operation 906, the user is contacted and instructed to conduct a post-sale interaction. The user may be contacted by various mechanisms, such as an phone call from an automated system or a human operator, an email message, a text message, or a private message provided via the system 200 (e.g., direct message from another user in the system 200). Post-sale interactions may include creating a profile in a forum database; posting on a forum; interacting with a physician, clinician, or other user of the placebo product;

At operation 908, an audit trail is constructed to track the post-sale interaction. The audit trail may be saved in a blockchain or another data structure that uses distributed ledger technology.

Another aspect of post-purchase support is reviewing feedback from other placebo product customers. Thus, in another aspect, a user may obtain feedback from consumers who have purchased or used a placebo product. The user may access the server system 201 using a client device 106 and create an analytics project. The analytics project is used to track usage, record feedback, and provide analysis of the feedback and usage to develop a placebo product. User feedback may be obtained through the server system 201 in various forms, such as with product feedback, product ratings, surveys, reviews, or the like. User feedback may also be obtained using objective monitoring, such as with various physiological, spatial, physical, telemetric, or other sensors that are used to monitor the user. For instance, a blood pressure cuff may obtain blood pressure readings from the user and communicate the readings to the server system 201. These physiological readings may be correlated with dosage patterns and used as a factor when evaluating placebo effectiveness.

User monitoring may be performed using active monitoring or passing monitoring. Active monitoring includes interactive monitors where a user may be interrogated and feedback is recorded. For instance, the user may be interrogated with a bedside display device to determine whether the user was compliant with dosage over a period (e.g., amount of placebo, timing of doses, or the like). Passive monitoring includes monitors that are used to observe the user while the user is in an environment. Passive monitoring may include use of cameras, wearable devices, microphones, or the like, installed in or around an environment (e.g., in the user's house) or worn or used by the user (e.g., on a smartwatch, monitoring belt, headband, or the like).

In another aspect, the server system 201 may be used by users (e.g., placebo product users, regulatory agencies, or others) to certify the effectiveness or purity of a placebo product. Certification is useful to further enhance the placebo effect for a user. By providing certification, an expectation of success is evoked in the user. This strengthens the mind-body link and consequently enhances the placebo effect. Certification may be administered by a regulatory agency or another third-party agency. Certification may be graded, such as gold, silver, bronze, to indicate the strength of the certification. For instance, a gold certification may indicate that a governmental agency (e.g., a Food and Drug Agency) tested and approved the placebo as having a beneficial placebo effect, a silver certification may indicate that a third-party testing agency tested and approved the placebo product, and a bronze certification may indicate that the placebo product has received an average score of 4.0 or higher on a 5.0 scale from user reviews. Other certification levels are considered to be within the scope of this disclosure. Certification may also be used to indicate that the placebo product is truly only composed of inert or inactive ingredients. In an embodiment, only certified placebo products are available in a marketplace, ensuring that a placebo product only includes inert ingredients with no medicinal effect.

In another aspect, a user may desire to compile a repository of placebo products from other sources. The other sources may be governmental agencies from one or more countries or jurisdictions, private databases, or other public databases from non-governmental agencies. When a clinical trial is conducted for drug testing, the drug's effectiveness is compared between a test group and a placebo group. The test group may be administered the drug under test while the placebo group is provided a non-active product. The results of the clinical studies are stored.

In some clinical trials, participants who were given the placebo product has the same or similar reactions to the participants who were given the drug. This is often considered a failure for the drug testing as the drug did not outperform the placebo. However, viewed another way, participants in both groups may have had a lift in their health condition and it should be recognized that the placebo performed the same or similar to the drug. As such, placebo products that were used in failed drug trials may be of particular interest for broader consumer groups.

Clinical trial databases may be searched to identify placebo products that were used in "failed" drug trials because such products performed similar to the drug under test. Data about these placebo products may then be stored in a repository of placebo products. The actual placebo products may be offered for sale as an auxiliary service to the searchable resource.

In another aspect, a user may access the server system 201 to search for available placebos to treat one or more health conditions that the user is experiencing. The user may access the server system 201 using an individual client device of the client devices 203 and perform a search by indicating one or more symptoms that the user is experiencing, a diagnosed condition, an illness, or other health parameters. The user may also provide demographic, biological, or other personal information, such as the user's age, height, weight, blood pressure, gender, ethnicity, dietary profile, or the like. This data may be used to search for or filter placebo products to identify one or more placebo products that may provide a health benefit to the user. Alternatively, the user may search for placebo products that purport to treat certain conditions. For instance, a user may search for all placebo products that treat migraines. Multiple dosage forms may be available for any given condition.

Although many examples discussed herein refer to the design, manufacture, sale, and support of placebo use, it is understood that the systems and methods may be adapted to design, manufacture, sell, or support natural remedies along with or in place of placebos. Both natural remedies and placebos may be offered for sale by non-medicinal dispensaries, such as retail health stores, grocery stores, or convenience stores, for example. Such design, manufacture, sale, or support of natural remedies may be implemented with other aspects of the systems described herein, including use of a usage agreement, providing a support structure that may include AI chatbots, or use of multiple dosage forms of the natural remedy (e.g., pill, capsule, liquid, etc.).

Hardware Platform

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instructions on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 10:
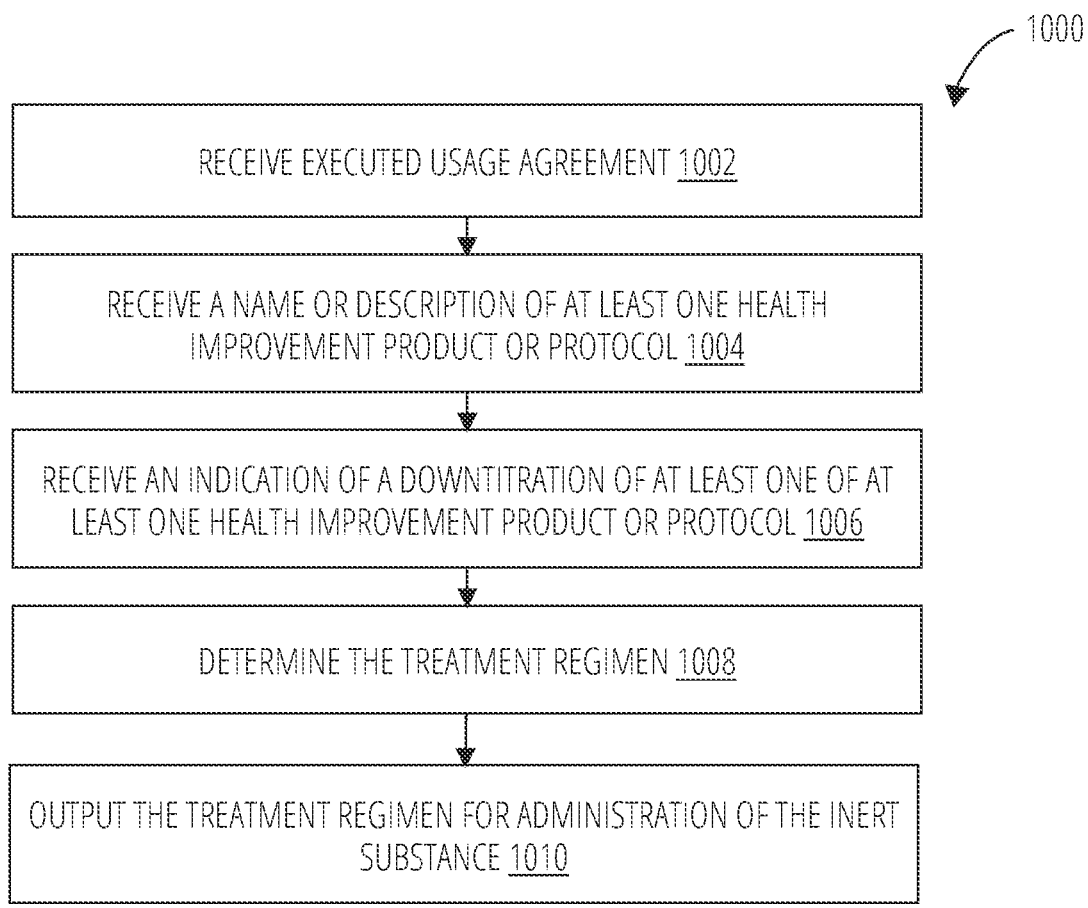
FIG. 10 illustrates a routine for supplementing or replacing at least one of a prescribed pharmaceutical, an over the counter (OTC) drug, or a homeopathic therapy.

FIG. 10 is a flowchart showing a method 1000 for supplementing or replacing a health improvement product or protocol with an inert substance, suitable for use with prescribed pharmaceuticals, over-the-counter (OTC) drugs, or homeopathic therapies. Such a method 1000 can be adaptable to various forms of health improvement products or protocols, as well as to the specific needs and conditions of the subject.

In block 1002, method 1000 receives a usage agreement, executed by at least one of the subject or a medical professional directing the subject, to use of an inert substance according to a treatment regimen. This agreement can help establish a consent and understanding necessary for the use of an inert substance, e.g., via the subject, in the treatment regimen.

In block 1004, method 1000 receives a name or description of at least one health improvement product or protocol administered to a subject for treatment of at least one symptom. This information may include the form of the product or protocol, such as whether it is a pill, injectable, liquid, transdermal, or chewable OTC or prescribed pharmaceutical. Such detail can help in selecting an inert substance that closely resembles the original product or protocol in form, aiding in the subject's transition to the inert substance and increasing a chance the subject will experience a placebo effect.

In block 1006, method 1000 receives an indication of a downtitration of at least one of a dosage or a timing parameter of the at least one health improvement product or protocol. For example, the indication of a downtitration can involve a reduction in dosage or adjustment in timing parameters of an OTC or prescribed pharmaceutical.

In 1008, method 1000 determines the treatment regimen, including an administration of the inert substance to the subject following the downtitration, the administration of the inert substance including notifying the subject that the inert substance is not pharmacologically active and is not the at least one health improvement product or protocol. Determining the treatment regimen can include selecting an inert substance from a class of certified possible inert substances based on the received name or description of the health improvement product or protocol. The selection process may involve choosing an inert substance that shares characteristics with the health improvement product or protocol, such as shape, size, color, taste, or texture, to facilitate subject compliance and comfort, as noted in claim 8.

In block 1010, method 1000 outputs the treatment regimen for administration of the inert substance via at least one of the subject or the medical professional directing the subject. The treatment regimen can be determined, at least in part, by taking into account the need to replace at least one previously-scheduled administration of the health improvement product or protocol with the inert substance following the downtitration. For example, the treatment regimen can be determined to help maintain a continuity of the subject's treatment schedule during introducing the inert substance.

In an example, the method 1000 may also include initiating interaction with the subject to discuss adherence to the treatment regimen. This interaction could take the form of a private dialogue via an electronic communication platform, such as including an artificial intelligence (AI) chatbot or involving interaction with a human user support group. Such interactions can help provide support and ensure the subject's understanding and compliance with the treatment regimen.

In an example, the method can include receiving feedback from the subject after commencing the treatment regimen. Such feedback may involve an indication of the frequency of occurrence of the symptom being treated and could correspond with an indication of satisfaction or severity on a scale of possible levels. Based on this feedback, the method can facilitate the establishment or adjustment of parameters of the inert substance or for recommending changes in the dosage or timing of the health improvement product or protocol.

In an example, the method can include receiving specific details about the downtitration, such as the amount of frequency or dosage reduction of the health improvement product or protocol. Such information can be used to better tailor the treatment regimen to the subject's changing needs, e.g., to one or more gaps in a subject's normal treatment protocol.

Figure 11:
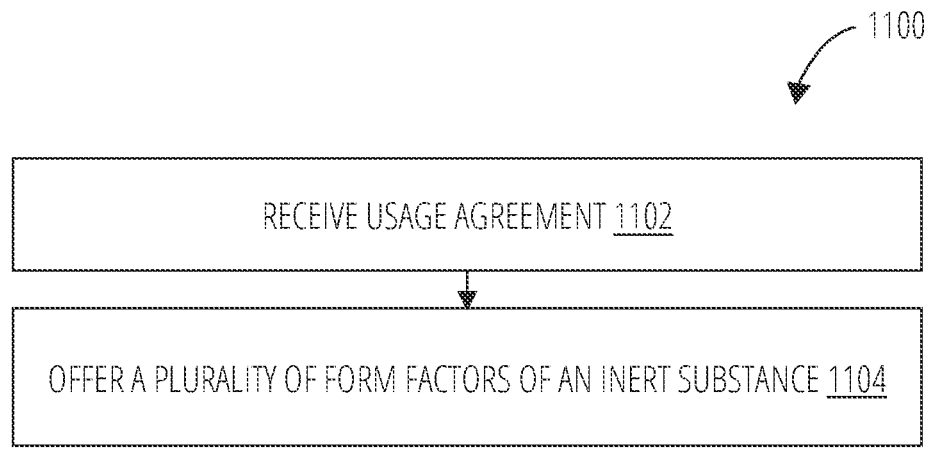
FIG. 11 illustrates an aspect of the subject matter in accordance with one embodiment.

FIG. 11 is a flowchart showing a method 1100 for replacing or supplementing at least one of three product-based health improvement protocols, the protocols including a prescribed pharmaceutical product, an over the counter (OTC) product, or a homeopathic product.

At block 1102, the method can include receiving a usage agreement, negotiated by the user with a placebo professional, and executed by at least one of the user or a medical professional directing the user, the usage agreement specifying use of an inert substance according to a placebo treatment protocol.

At block 1104, the method can include offering, by the placebo professional and to the user, a plurality of form factors of the inert substance for each health improvement condition of the user. For example, an individual form factor of the plurality can be selectable by the user. Also, each of the plurality of form factors can include a different physical characteristic, including at least one of a shape, a size, a color, a taste, or a texture of the inert substance. In an example, the individual form factor includes at least one physical characteristic including of a pill, an injectable, a liquid, a transdermal cream, or a patch, chewable over-the-counter (OTC) pharmaceutical. For example, the receiving the negotiated usage agreement can include receiving at least one negotiation term from the placebo professional. The receiving the negotiated usage agreement can also include receiving at least one negotiation term from the user, including selecting the form factor of the product.

Figure 12:
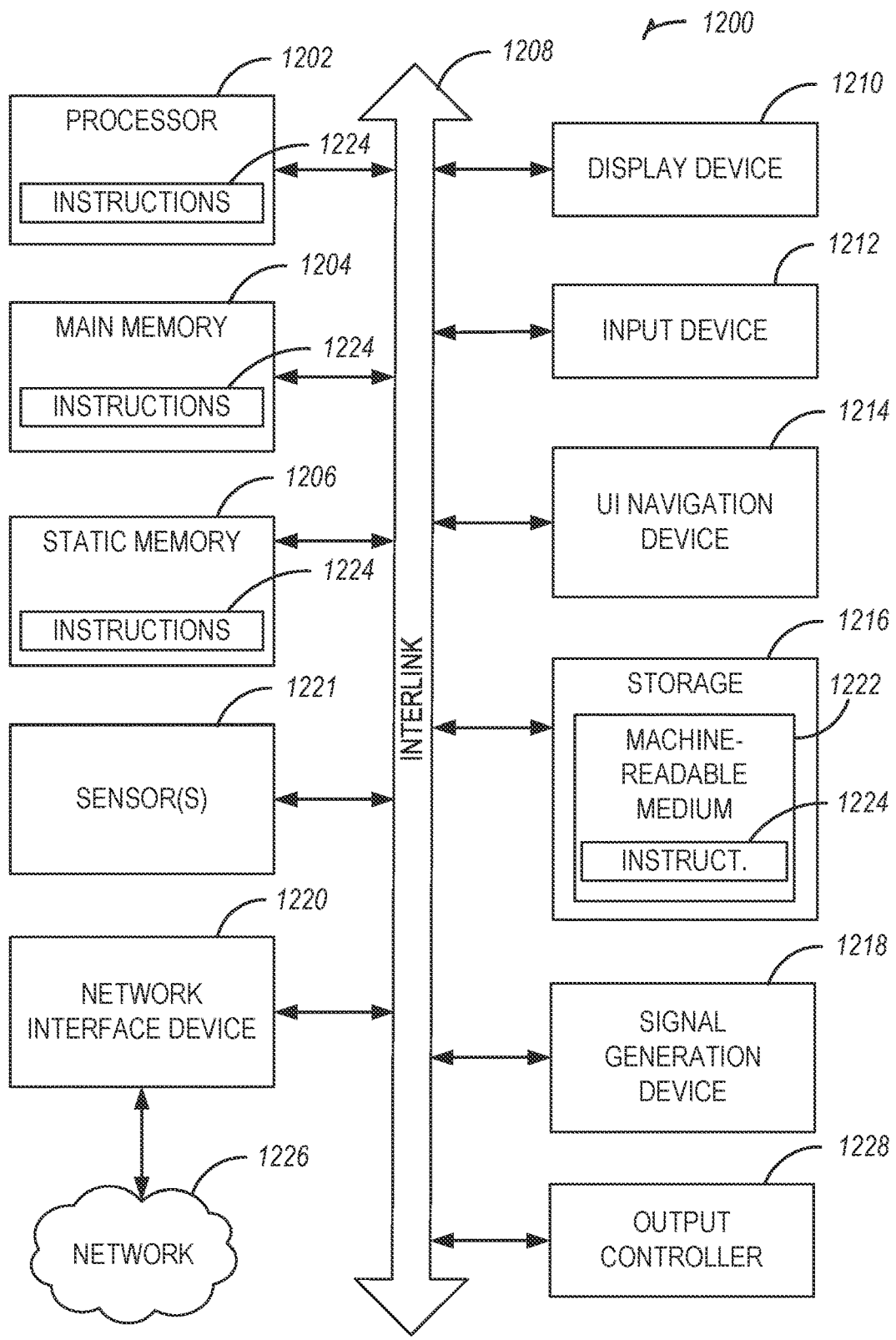
FIG. 12 illustrates generally an example of a block diagram of a machine.

FIG. 12 illustrates generally an example of a block diagram of a machine 1200 upon which any one or more of the techniques (e.g., methodologies) discussed herein may perform in accordance with some examples. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a display unit 1210, an alphanumeric input device 1212 (e.g., a keyboard), and a user interface (UI) navigation device 1214 (e.g., a mouse). In an example, the display unit 1210, alphanumeric input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine readable medium 1222 that is non-transitory on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 1202.11 family of standards known as Wi-Fi®, IEEE 1202.16 family of standards known as WiMax®), IEEE 1202.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software.

The following, non-limiting examples, detail certain aspects of the present subject matter to solve the challenges and provide the benefits discussed herein, among others.

The above Detailed Description can include references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that can include elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that can include elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The following, non-limiting examples, detail certain aspects of the present subject matter to solve the challenges and provide the benefits discussed herein, among others.

The above Detailed Description can include references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that can include elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that can include elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A health improvement method for replacing or supplementing an existing pharmaceutical or homeopathic health product or protocol using a placebo product, a usage agreement, and a support group, the method comprising:
   by a server, offering, via a user interface displayed on a client device, a plurality of inert substances for selection by the user, wherein the plurality of inert substances are offered in a plurality of form factors;

by the server, receiving, via an input field of the user interface, a selection by a user of a form factor from among the plurality of form factors available via the user interface;

receiving, by the server, a customized usage agreement from the client device, wherein the terms of the usage agreement are determined by the user and include a timing and dosage of inert product administration;

by the server, using the customized usage agreement and the form factor selected by the user, determining that a treatment regimen includes the timing and the dosage of the inert product administration specified by the customized usage agreement, and that the treatment regimen includes a replacement of at least one administration of the existing pharmaceutical or homeopathic health product or protocol with at least one administration of the inert substance according to the form factor selected by the user in the input field of the user interface; and by the server, initiating an interaction with the user regarding adherence to the treatment regimen, wherein the interaction is an interaction with a peer directed user support group.

2. The method of claim 1, wherein each of the plurality of form factors includes a different physical characteristic of the product.

3. The method of claim 1, wherein receiving the customized usage agreement comprises, by the server:
transmitting at least one negotiation term to the user; and
receiving at least one or more negotiation of product usage terms from the user, in addition to selecting the form factor of the product.

4. The method of claim 1, wherein an individual form factor includes at least one physical characteristic including, for each condition, two or more of pills, injectables, fluids, transdermal creams, patches, chewable, or other form factor.

5. The health improvement method of claim 1, wherein the user interface comprises:
a dropdown menu or radio buttons for receiving the selection by the user of the form factor from among the plurality of form factors;
a text box for receiving one or more of the timing or dosage of the inert product administration; and
a virtual presentation of an image of the inert product being designed.

6. The health improvement method of claim 1,
wherein a mobile application displays the user interface;
wherein, via the mobile application, the user selects the form factor from among the plurality of form factors available via the user interface;
wherein, via the mobile application, the user selects the terms of the usage agreement including the timing and the dosage of the inert product administration; and
wherein, via the mobile application, the user interacts with the peer directed user support group.

7. A method for addressing a health condition, the method comprising:
by one or more processors:
receiving a usage agreement, executed by a user, to use an inert substance according to a treatment regimen, wherein terms of the usage agreement are determined by the user and include a timing and dosage of inert product administration;
offering, via a user interface displayed on a client device, a plurality of inert substances for selection by the user, wherein the plurality of inert substances are offered in a plurality of form factors;
receiving, via an input field of the user interface, a selection by the user of a form factor or form factors from among the plurality of form factors available via the user interface;
receiving a name or description of at least one health improvement product or protocol administered to the user for treatment of at least one symptom;
receiving an indication of a downtitration of at least one of a dosage or a timing parameter of the at least one health improvement product or protocol;
using the customized usage agreement and the form factor selected by the user, determining that a treatment regimen includes the timing and the dosage of the inert product administration specified by the customized usage agreement, wherein the treatment regimen includes an administration of the inert substance to the user according to the form factor selected by the user in the input field of the user interface, the administration of the inert substance including notifying the user that the inert substance is not pharmacologically active; and
outputting the treatment regimen for administration of the inert substance as directed by the user.

8. The method of claim 7, wherein the at least one health improvement product or protocol is at least one of an offered selection of placebo products or protocols.

9. The method of claim 7, wherein determining the treatment regimen includes replacing at least one previously-scheduled administration of the at least one health improvement product or protocol with the administration of the inert substance.

10. The method of claim 7, wherein:
the at least one health improvement product or protocol resembles an inert version of a pill, an injectable, a transdermal, or other pharmaceutical or homeopathic product.

11. The method of claim 7, further comprising, by the one or more processors, initiating a second interaction with the subject regarding adherence to the treatment regimen.

12. The method of claim 11, wherein the initiating the second interaction includes engaging in a private dialogue with the subject via an electronic communication platform.

13. The method of claim 12, wherein the engaging in a dialogue includes, at least in part, use of an artificial intelligence (AI) chatbot.

14. The method of claim 7, wherein the inert substance includes at least one characteristic resembling the at least one health improvement product or protocol, the at least one characteristic including at least one of a shape, a size, a color, a taste, or a texture of the inert substance.

15. A computing apparatus comprising:
a processor; and
a memory storing instructions that, when executed by the processor, configure the apparatus to:
receive a usage agreement, executed by a subject, to use an inert substance according to a treatment regimen, wherein terms of the usage agreement are determined by the subject and include a timing and dosage of inert product administration;
offer, via a user interface displayed on a client device, a plurality of inert substances for selection by the subject, wherein the plurality of inert substances are offered in a plurality of form factors;
receive, via an input field of the user interface, a selection by the subject of a form factor from among the plurality of form factors available via the user interface;

receive a name or description of at least one health improvement product or protocol administered to the subject for treatment of at least one symptom;

using the customized usage agreement and the form factor selected by the subject, determine that a treatment regimen includes the timing and the dosage of the inert product administration specified by the subject in the customized usage agreement, wherein the treatment regimen includes an administration of the inert substance to the subject, the administration of the inert substance including notifying the subject that the inert substance is not pharmacologically active and is not the at least one health improvement product or protocol;

output the treatment regimen for administration of the inert substance via the subject; and initiating an interaction with the subject regarding adherence to the treatment regimen, wherein the interaction is an interaction with a peer directed user support group.

* * * * *